United States Patent
Kincaid et al.

(10) Patent No.: US 10,247,266 B2
(45) Date of Patent: Apr. 2, 2019

(54) BRAKE MOUNTING BRACKET APPARATUS

(71) Applicant: BWI (SHANGHAI) CO., LTD., Shanghai (CN)

(72) Inventors: Michael Paul Kincaid, Burton, MI (US); Matthew Alexander Valvano, Pinckney, MI (US); Martin John Reder, Essexville, MI (US)

(73) Assignee: BWI (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/925,635

(22) Filed: Oct. 28, 2015

(65) Prior Publication Data
US 2016/0123413 A1    May 5, 2016

Related U.S. Application Data

(60) Provisional application No. 62/072,495, filed on Oct. 30, 2014.

(51) Int. Cl.
*F16D 65/092* (2006.01)
*F16D 65/00* (2006.01)
(Continued)

(52) U.S. Cl.
CPC ....... *F16D 65/0006* (2013.01); *F16D 55/226* (2013.01); *F16D 65/0056* (2013.01); *F16D 2055/0016* (2013.01)

(58) Field of Classification Search
CPC ......... F16D 2055/0008; F16D 65/0056; F16D 65/183; F16D 65/095; F16D 55/226; F16D 55/2262
See application file for complete search history.

(56) References Cited

U.S. PATENT DOCUMENTS 3,990,545 A    11/1976 Hoffmann et al.
5,564,532 A *  10/1996 Baba ................. F16D 55/226
                                              188/205 A
(Continued)

FOREIGN PATENT DOCUMENTS

CN    201196226     5/2008
CN    101936352 A   1/2011
(Continued)

OTHER PUBLICATIONS

International Search Report, dated Jan. 15, 2016, 12 Pages.
(Continued)

*Primary Examiner* — Bradley T King
*Assistant Examiner* — Stephen M Bowes
(74) *Attorney, Agent, or Firm* — William H. Honaker; Dickinson Wright PLLC

(57) ABSTRACT

A brake mounting bracket apparatus that includes a rear body and a front body. The rear body includes an inboard tie bar and a pair of legs that each extend from a lower portion at the inboard tie bar to a terminal end. The front body includes an outboard tie bar and a pair of arms that each extend from the outboard tie bar to a distal end. A pair of bridges each extend between one of the legs and one of the arms. A pair of webs each extend outwardly from one of the bridges for providing stiffness to the bridges and for damping vibrations in the mounting bracket apparatus.

12 Claims, 10 Drawing Sheets

(51) Int. Cl.
*F16D 55/226* (2006.01)
*F16D 55/00* (2006.01)

(56) References Cited

U.S. PATENT DOCUMENTS

| | | | |
|---|---|---|---|
| 5,785,156 A | 7/1998 | Warwick et al. | |
| 6,131,706 A * | 10/2000 | Gotti | F16D 55/227 188/72.4 |
| 6,179,095 B1 | 1/2001 | Weiler et al. | |
| 6,223,866 B1 | 5/2001 | Giacomazza | |
| 6,386,335 B1 | 5/2002 | BiPonio | |
| D490,350 S | 5/2004 | Blaschke et al. | |
| 7,475,759 B1 | 1/2009 | Sherman, II | |
| 7,604,098 B2 | 10/2009 | Dessouki et al. | |
| 7,926,631 B2 | 4/2011 | Roberts et al. | |
| 8,469,159 B2 | 6/2013 | Lowe et al. | |
| 8,540,061 B1 | 9/2013 | Plantan et al. | |
| 8,544,614 B1 | 10/2013 | Plantan et al. | |
| 2001/0032757 A1 | 10/2001 | Ballinger et al. | |
| 2002/0017436 A1* | 2/2002 | Ortegren | F16D 65/183 188/73.31 |
| 2007/0023240 A1 | 2/2007 | Dessouki et al. | |
| 2008/0067015 A1 | 3/2008 | Thomas et al. | |
| 2010/0326777 A1 | 12/2010 | Noguchi et al. | |
| 2011/0127124 A1* | 6/2011 | Lowe | F16D 65/0006 188/73.37 |
| 2012/0043168 A1 | 2/2012 | Narayanan V et al. | |
| 2012/0085597 A1 | 4/2012 | Narayanan V et al. | |

FOREIGN PATENT DOCUMENTS

| | | | |
|---|---|---|---|
| CN | 102080697 | 6/2011 | |
| CN | 102252048 B | 12/2012 | |
| DE | 102012020293 A1 | 11/2013 | |
| EP | 0727590 A1 | 8/1996 | |
| GB | 1237775 A * | 6/1971 | F16D 55/2262 |
| JP | 516821 | 1/1976 | |
| JP | 55090726 | 7/1980 | |
| JP | 2245528 | 10/1990 | |
| JP | 1061683 | 3/1998 | |
| JP | 3465339 B2 | 11/2003 | |
| JP | 2008138752 | 6/2006 | |

OTHER PUBLICATIONS

Japanese Office Action No. 2016-530847 dated Jan. 10, 2017, Three (3) Pages (includes English Translation, Four (4) Pages).
Korean Office Action, Application No. 10-2016-7012857 dated Aug. 16, 2017, 5 pages (includes English translation).
Chinese Office Action, Application No. 201580002615.0 dated Jun. 30, 2017, 18 pages (includes English translation).

* cited by examiner

US 10,247,266 B2

BRAKE MOUNTING BRACKET APPARATUS

CROSS REFERENCE TO RELATED APPLICATIONS

This U.S. patent application claims the benefit of U.S. Provisional Patent Application Ser. No. 62/072,495 filed on Oct. 30, 2014 entitled "BRAKE MOUNTING BRACKET APPARATUS," the entire disclosure of the application being considered part of the disclosure of this application and hereby incorporated by reference.

BACKGROUND OF THE INVENTION

1. Field of the Invention

A brake mounting bracket apparatus. More particularly, a brake mounting bracket apparatus that includes a pair of webs for damping vibrations in the mounting bracket apparatus.

2. Description of the Prior Art

Conventional disc brake systems for automotive vehicles are known to produce undesirable noises and vibrations during operation. Therefore, apparatuses have been developed to eliminate or reduce such noises and vibrations. As presented in FIGS. 1 and 2, known damping systems often include the incorporation of mass features that are fastened to the brake caliper housings and bracket, and/or springs to provide a mechanical pre-load between components of the brake system to dampen, or "tune out" the noises and vibrations. Because of the need to maintain a gap between the brake components and the wheels of the automotive vehicle, there is limited packaging space to incorporate such apparatuses into brake systems. Further, such apparatuses are typically installed in areas that are visible to the end consumer, which can consequently exhibit an undesirable visual appearance. Furthermore, such apparatuses tend to be constructed of numerous parts that are fastened to one another, and therefore tend to be prone to failure and not easily customized for particular applications. Accordingly, there remains a need for an improved apparatus for reducing brake noises and vibrations.

SUMMARY OF THE INVENTION

According to an aspect of the disclosure, a brake mounting bracket apparatus for a vehicle is provided. The brake mounting bracket apparatus includes a rear body and a front body disposed in spaced and parallel relationship with one another, each for holding a brake pad of the vehicle. The rear body includes an inboard tie bar that extends between a pair of margins, and a pair of legs that each extend from a lower portion at one of the margins to a terminal end. The front body includes an outboard tie bar that extends between a pair of boundaries and a pair of arms that each extend from a bottom portion at one of the boundaries to a distal end. A pair of bridges each extend between the terminal end of one of the legs and the distal end of one of the arms for connecting the front and rear bodies to one another. A pair of webs each extend outwardly from one of the bridges for providing stiffness to the bridges and for damping vibrations in the mounting bracket apparatus.

According to another aspect of the disclosure, a brake mounting bracket apparatus for a vehicle is provided. The brake mounting bracket apparatus includes a rear body and a front body disposed in spaced and parallel relationship with one another, each for holding a brake pad of the vehicle. The rear body includes an inboard tie bar that extends along a back plane and a pair of legs that each extend along the back plane between a lower portion that engages the inboard tie bar and a terminal end spaced from the inboard tie bar. The front body includes an outboard tie bar that extends in spaced and parallel relationship with the inboard tie bar, and a pair of arms that each extend along a front plane in parallel relationship with the back plane, with the arms extending between a bottom portion that engages the outboard tie bar and a distal end that is spaced from the outboard tie bar. A pair of bridges each extend between the terminal end of one of the legs and the distal end of one of the arms for connecting the front and rear bodies to one another. A pair of webs each extend outwardly from one of the bridges for providing stiffness to the bridges and for damping vibrations in the mounting bracket apparatus during operation of the vehicle.

Thus several advantages of one or more aspects of the invention are that the brake mounting bracket apparatus provides for a damping mass that comprises few parts, is easily tunable to dampen vibrations for particular applications, and is aesthetically pleasing to consumers.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE EXAMPLE EMBODIMENT

Figure 1:
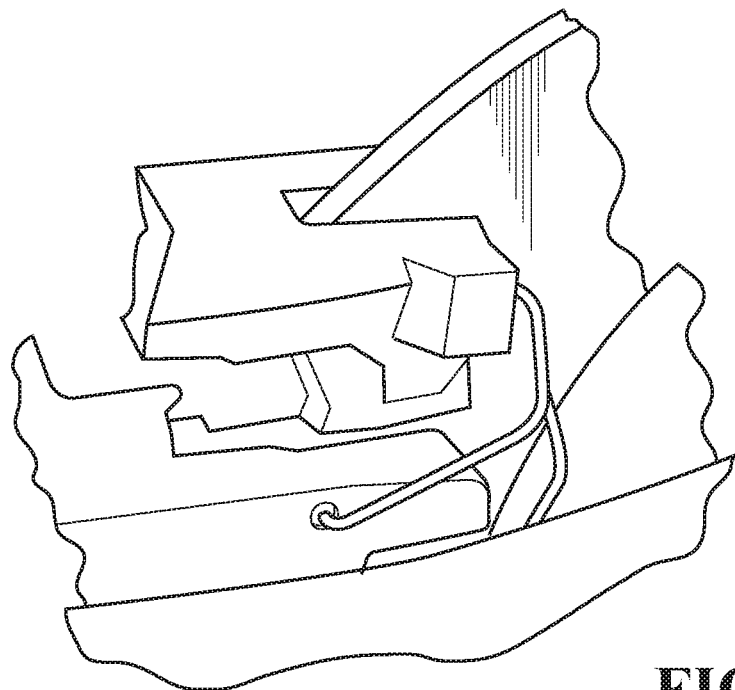
FIG. 1 is a perspective view of a conventional brake vibration damping system utilizing springs.
Figure 2:
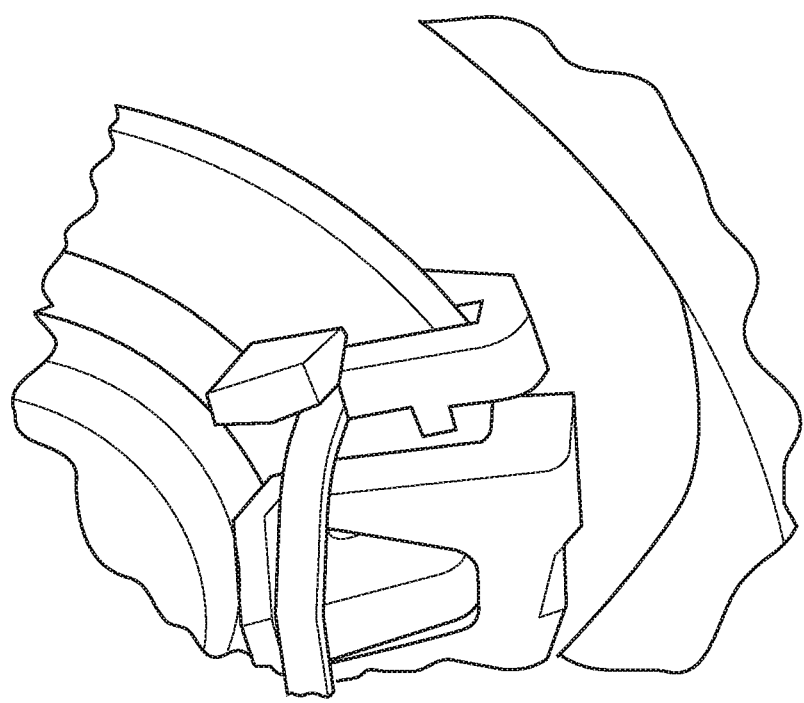
FIG. 2 is a perspective view of a conventional brake vibration damping system utilizing mass features fastened to the caliper housing.

Referring to the Figures, wherein like numerals indicate corresponding parts throughout the several views, a brake caliper mounting bracket apparatus 20, 120, 220, 320 is generally shown. The brake caliper mounting bracket apparatus 20, 120, 220, 320 includes a rear body 22 that has a generally C-shaped cross-section and extends along a back plane B. The rear body 22 includes an inboard tie bar 24 and a pair of legs 26. The inboard tie bar extends between a pair of margins 25. The pair of legs 26 each extend from one of the margins 25 of the inboard tie bar 24 and diverge away from one another and terminate at an terminal end 28.

The bracket apparatus further includes a front body 30 that has a generally C-shaped cross-section and extends along a front plane F that is spaced and parallel to the back plane B. The front body 30 includes an outboard tie bar 32 and a pair of arms 34. The outboard tie bar 32 extends between a pair of boundaries 33. The arms 34 each diverge away from one of the boundaries 33 of the outboard tie bar 32 and terminate at a distal end 36. The outboard tie bar 32 has a generally U-shape and has a base that extends in spaced relationship with the front plane F. The outboard tie bar 32 further includes a pair of fingers 40 that each extend perpendicularly to the front plane F away from the base 38 to one of the arms 34. It should be appreciated that the legs 26 and arms 34 could extend from the inboard and outboard tie bars 24, 32 at various angles, or alternatively could extend perpendicularly to the inboard and outboard tie bars 24, 32 without departing from the scope of the subject disclosure.

The lower portion of each of the legs 26 define a pair of mounting openings 42 that each extend perpendicular to the back plane B and through the inboard tie bar 24 adjacent to inboard tie bar 24 for connecting the rear body 22 to a steering knuckle or axle assembly bracket of a vehicle. Each of the legs 26 and arms 34 define a slot 44 for receiving tabs of brake pads 46 for securing the brake pads 46 to the caliper mounting bracket apparatus 20, 120, 220, 320. Each of the slots 44 extend between a bottommost periphery neighboring the lower portion of the leg 26 and a topmost periphery neighboring said terminal end 28 of the leg 26.

A pair of bridges 48 each extend perpendicularly to the back and front planes B, F and each interconnect one of the terminal ends 28 of one of the legs 26 and one of the distal ends 36 of one of the arms 34. A pair of webs 50 each extend outwardly from one of the bridges 48. The webs 50 are each integrally connected with one of the bridges 48. The webs 50 provide stiffness to the bridges 48 and dampen vibrations in the mounting bracket apparatus 20, 120, 220, 320. Said another way, the webs 50 provide for a perimeter structure that extends beyond the bridge 48 between the inboard and outboard tie bars 24, 32 for increasing the local stiffness of the mounting bracket apparatus 20, 120, 220, 320 and for isolating vibrations by revising the natural frequencies of the mounting bracket apparatus 20, 120, 220, 320. In the example embodiments, the webs 50 and other components of the mounting bracket apparatus 20, 120, 220, 320 are made of a cast iron material. However, the webs and/or other components could be made out of other materials such as, aluminum, steel or the like without departing from the scope of the subject disclosure.

In the disclosed example embodiments, the webs 50 each have a pair of sidewalls 51 that extend parallel to the front and back planes F, B and are spaced from one another. The webs 50 further each include a top face 52 that extends between the sidewalls 51 from an uppermost region 53 to an outermost peak 54. Each of the webs 50 extend between the uppermost region 53 to the outermost peak 54 in a continuous arc-shape. It should be appreciated that the continuous arc shape between the uppermost region 53 and the outermost peak 54 advantageously allows the bracket apparatus 20, 120, 220 to be easily manufactured/formed, provides for a large vibration damping mass shape that does interfere with other brake assembly/wheel components, and provide for an aesthetically appealing design.

The outermost peak 54 of each of the webs 50 is spaced outwardly from the outboard and inboard tie bars 24, 32. Additionally, the outermost peak 54 is spaced from the inboard and outboard tie bars 24, 32 in an upward direction generally toward the terminal end 28 of the legs 26. Said another way, the outermost peak 54 is positioned above both the inboard and outboard tie bars 24, 32. Furthermore, the outermost peak 54 of each of the webs 50 is spaced in th upward direction from the bottommost portions of said slots 44. It should be appreciated that positioning the outermost peak 54 relative to the inboard and outboard tie bars 24, 32 as described further provides for increased damping capabilities of the apparatus 20, 120, 220 without interfering with other brake assembly/wheels components and further provides for an aesthetically appealing design.

Figure 3:
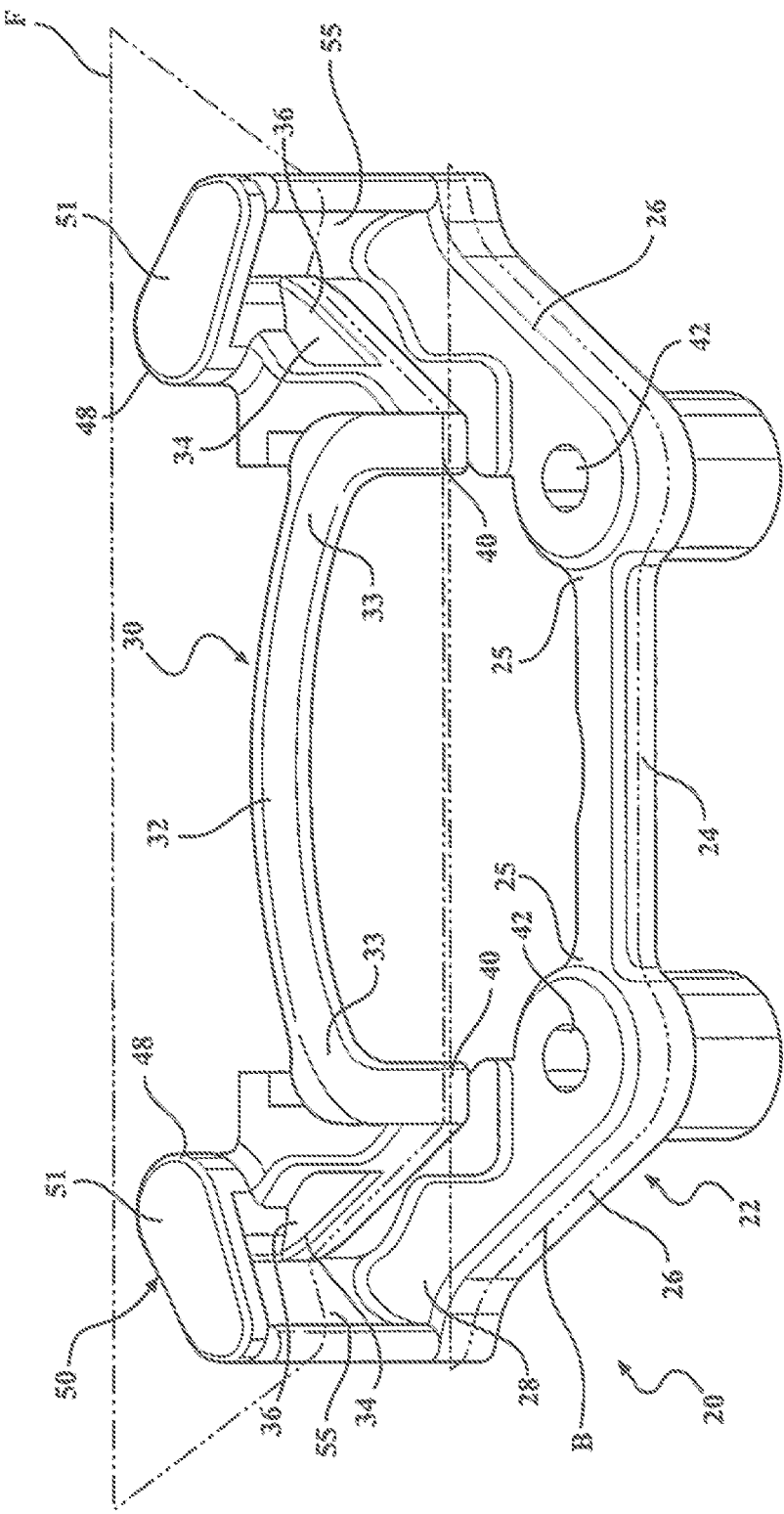
FIG. 3 is a perspective view of a first example embodiment of the brake mounting bracket apparatus for use on a rear brake system of an automobile.
Figure 4:
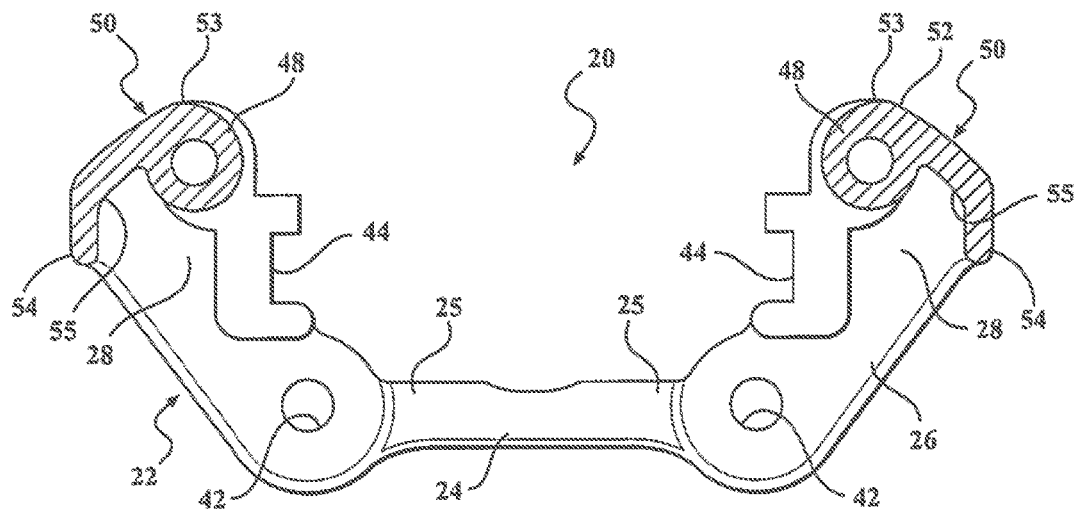
FIG. 4 is a side view of the first example embodiment of the brake mounting bracket apparatus for use on a rear brake system of an automobile.
Figure 5:
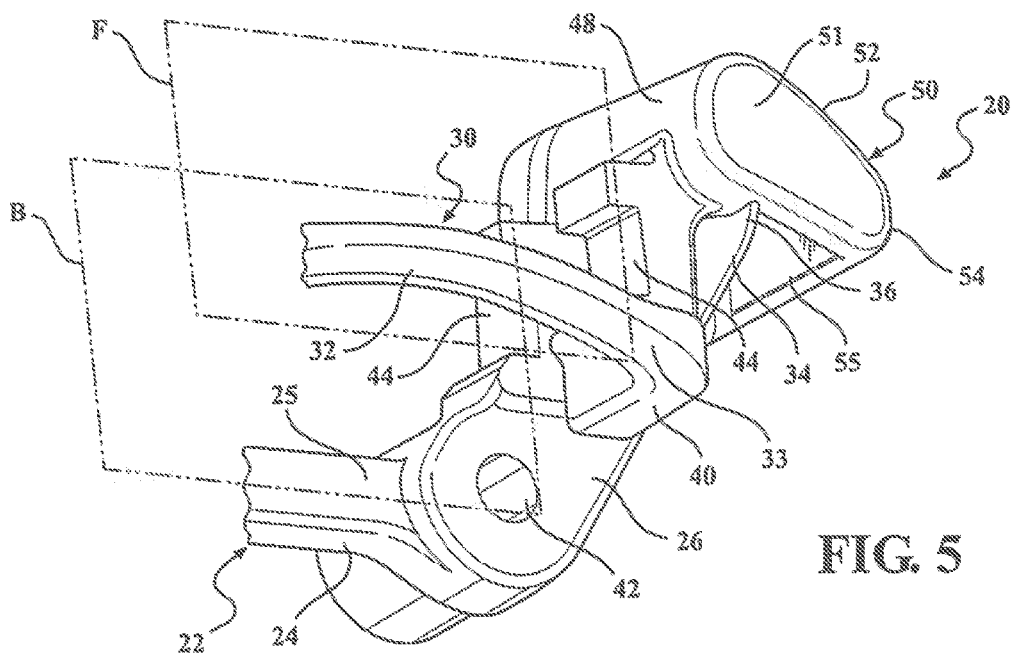
FIG. 5 is a partial perspective view of the first example embodiment of the brake mounting bracket apparatus for use on a rear brake system of an automobile.

In a first example embodiment of the bracket apparatus 20 as best presented in FIGS. 3-5, and a second example embodiment of the bracket apparatus 120 best presented in FIGS. 11-14, each of the webs 50 define a recess 55 that extends between the sidewalls 51. Because of the presence of the recess 55, the webs 50 only define a thin-walled perimeter structure that extends between the sidewalls 51. Further, in these embodiments, each of the sidewalls 51 have a generally oblong shaped cross-section.

Additional masses of material can be included in the recess 55 to tune the webs 50 to dampen vibrations based on the needs of particular applications of use. Said another way, the recess 55 provides for a thin-wall construction of the webs 50, which provides for the ability to make geometric modifications to the webs 50 to provide for frequency tuning of the vibration damping capabilities of the apparatus mounting bracket apparatus 20, 120, 220, 320. Therefore, the construction of the webs 50 allows designers to positively influence the modal coupling between the mounting bracket apparatus 20, 120, 220, 320, caliper housing, and brake disc without adding separate attenuating mass features or pre-loading spring features into the design like conventional damping apparatuses. Because of the simple construction of the webs 50, the cost of designing and incorporating additional masses to the web 50 at specific locations to dampen sounds and vibrations for particular applications is low in comparison to conventional damping systems.

Figure 6:
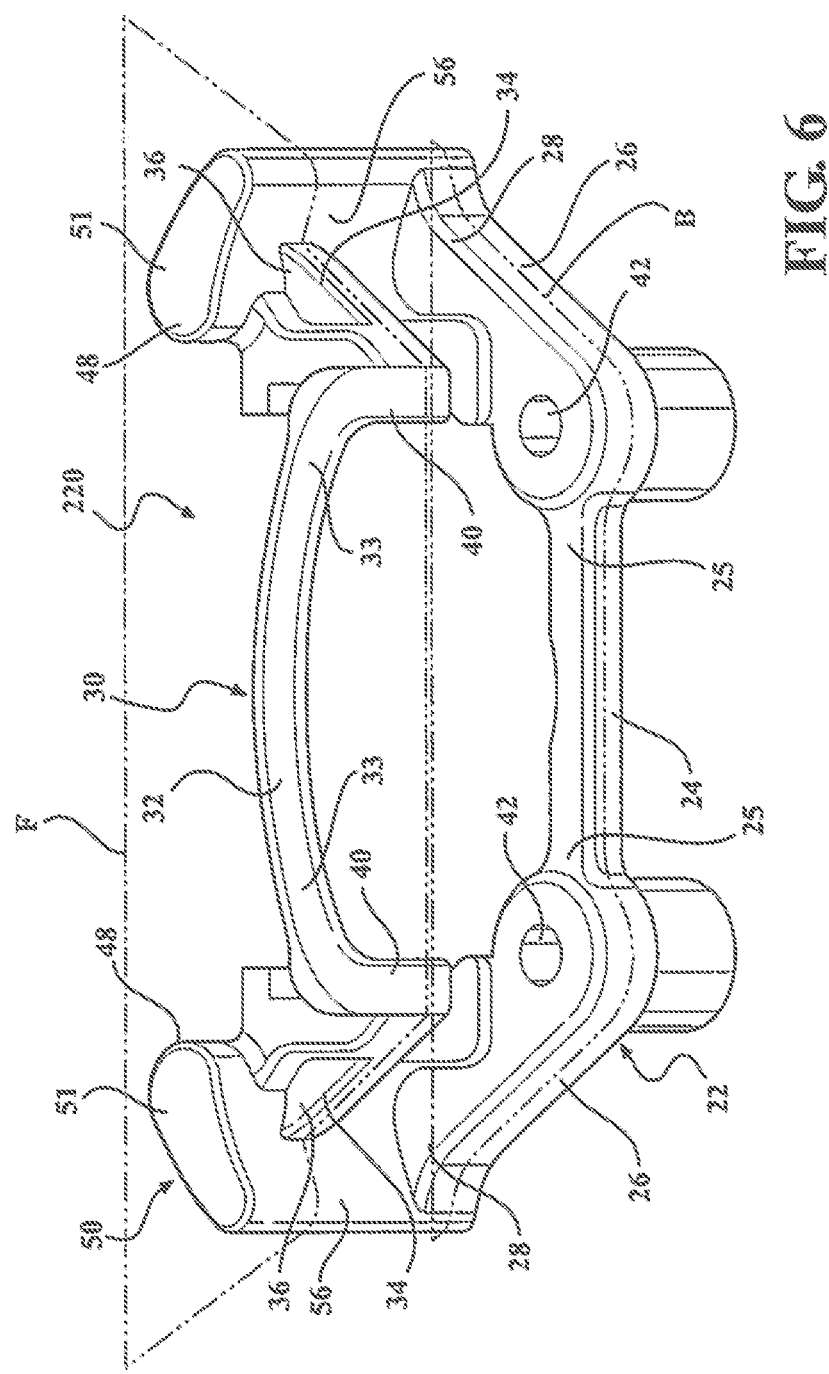
FIG. 6 is a perspective view of a third example embodiment of the brake mounting bracket apparatus for use on a rear brake system of an automobile.
Figure 7:
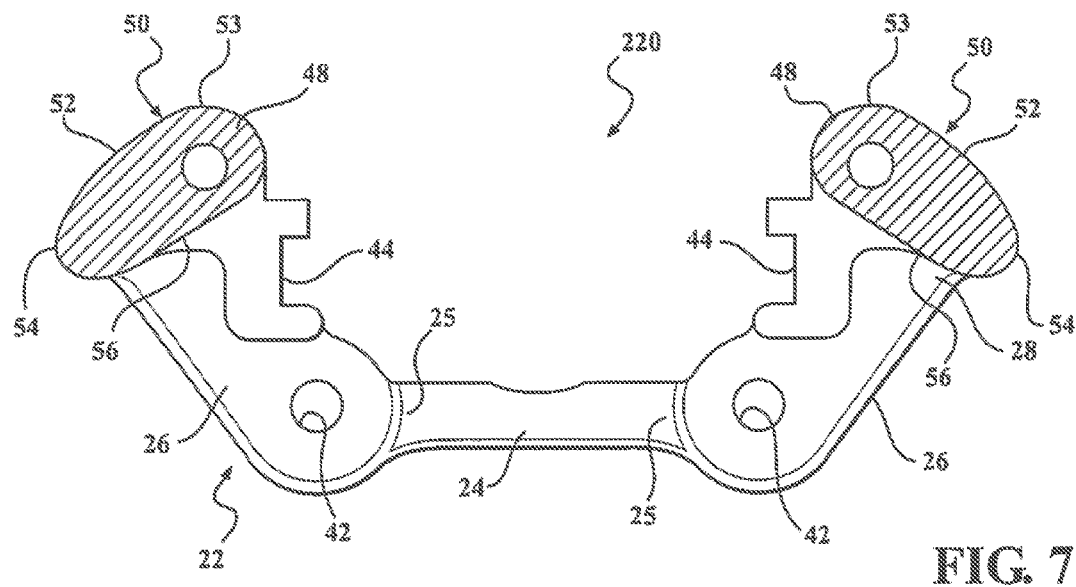
FIG. 7 is a side view of the third example embodiment of the brake mounting bracket apparatus for use on a rear brake system of an automobile.
Figure 9:
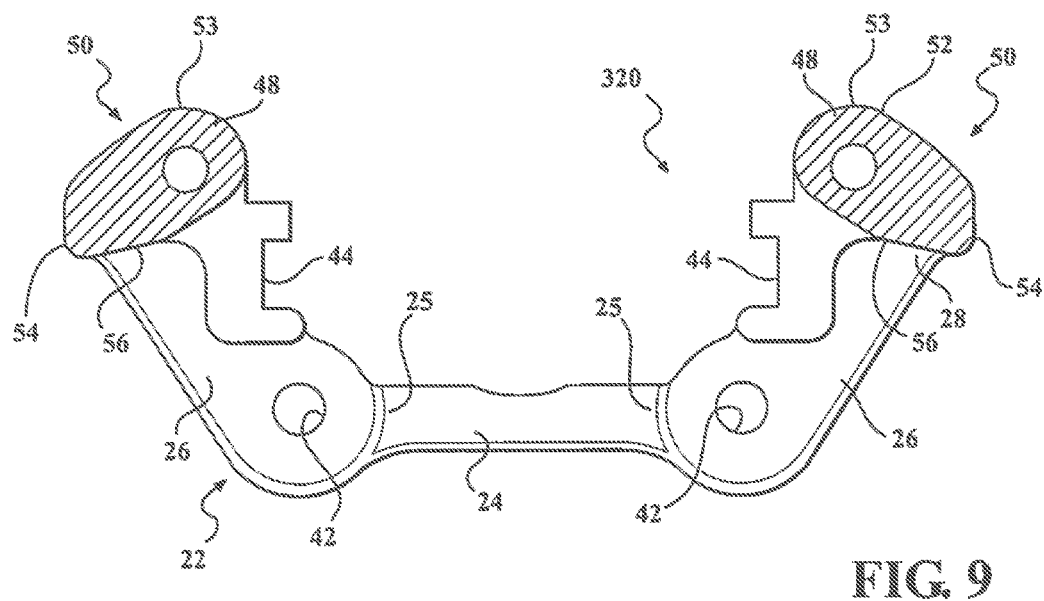
FIG. 9 is a side view of the fourth example embodiment of the brake mounting bracket apparatus for use on a rear brake system of an automobile.
Figure 8:
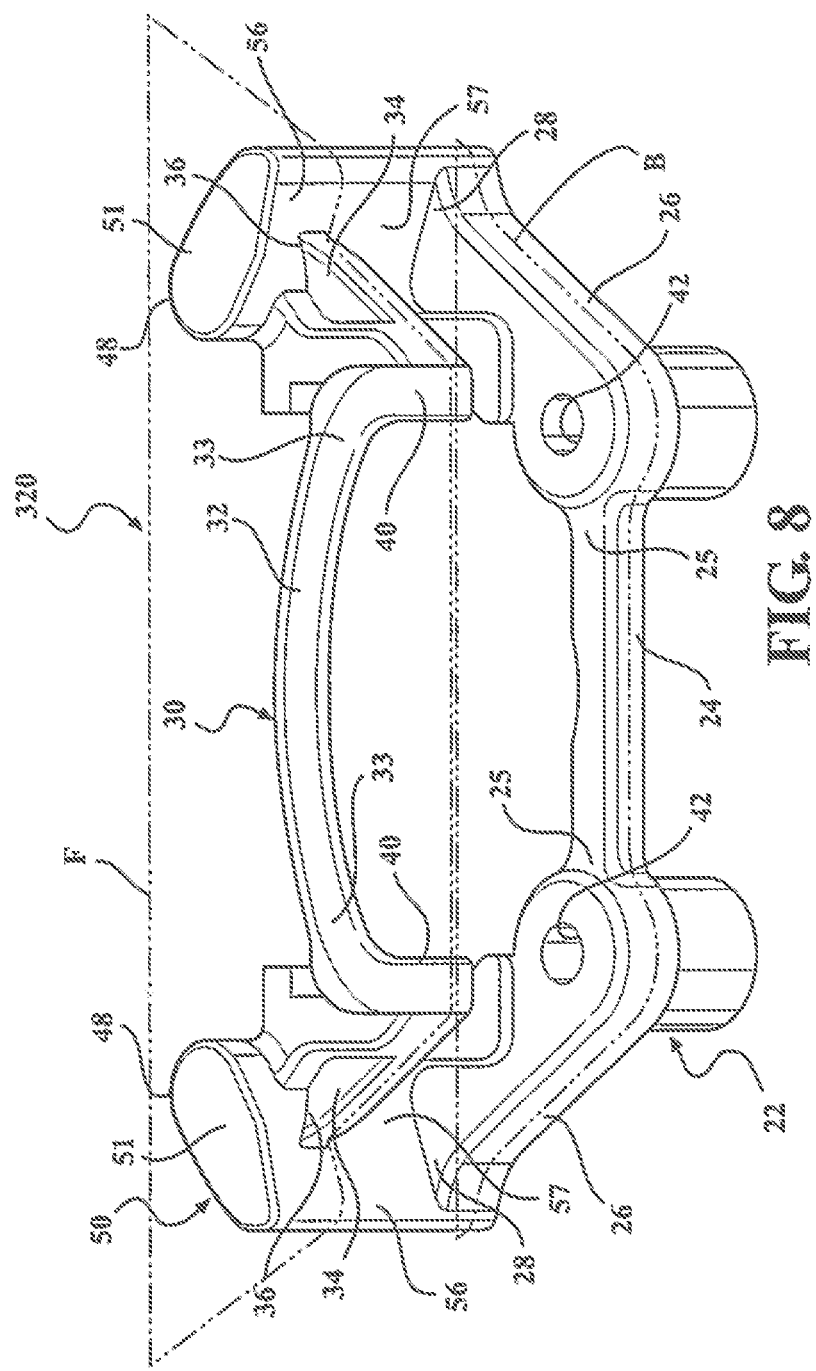
FIG. 8 is a perspective view of a fourth example embodiment of the brake mounting bracket apparatus for use on a rear brake system of an automobile.
Figure 10:
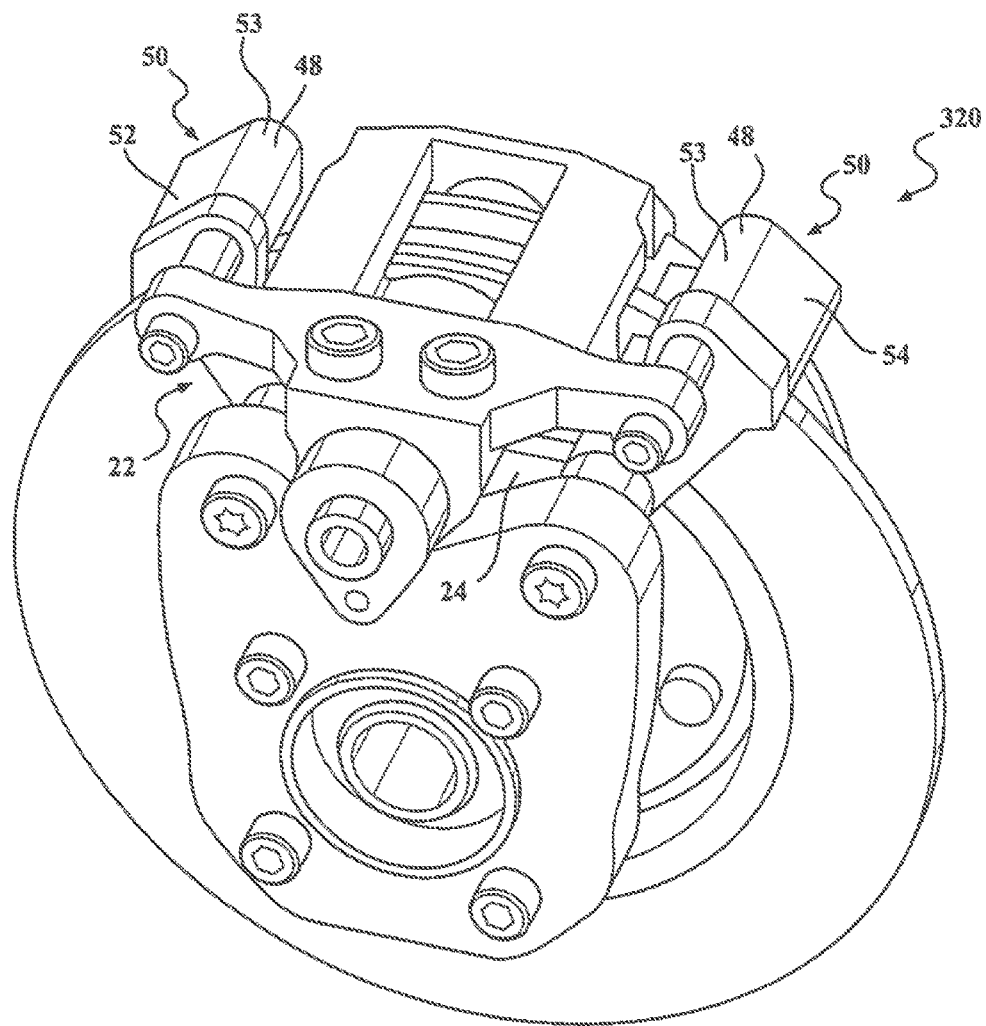
FIG. 10 is a perspective view of the fourth example embodiment of the brake mounting bracket apparatus mounted on a rotor of a rear brake system of an automobile.
Figure 11:
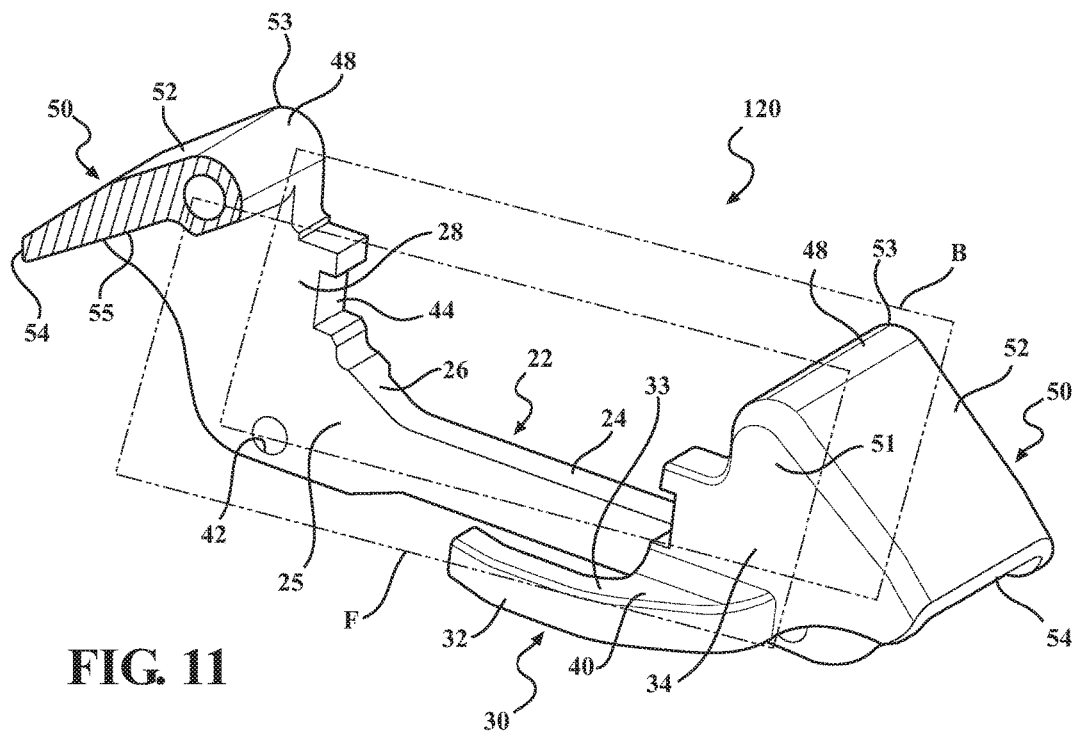
FIG. 11 is a perspective partial view of a second example embodiment of the brake mounting apparatus for use on a front brake system of an automobile.
Figure 12:
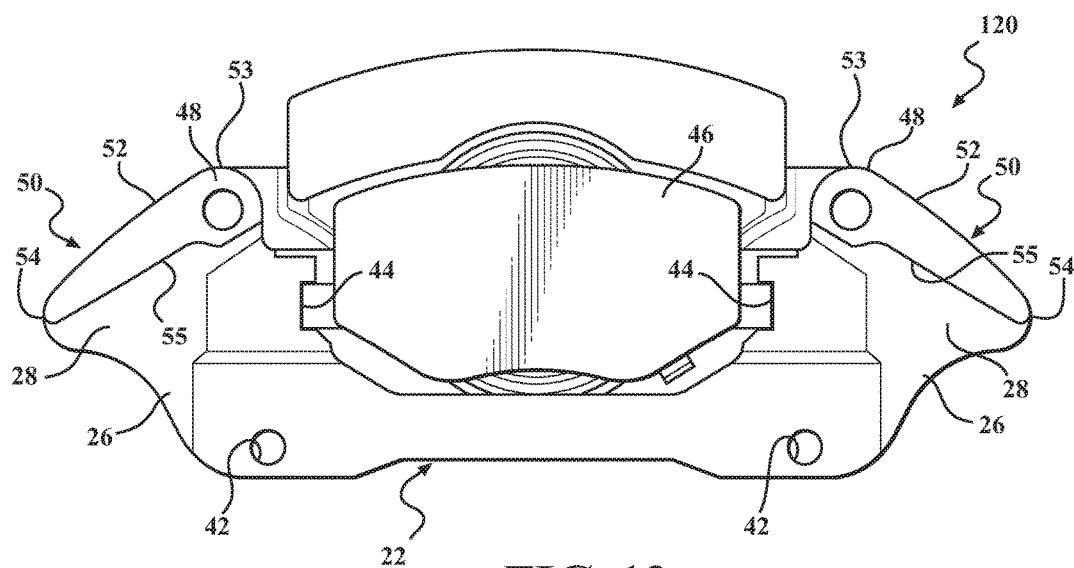
FIG. 12 is a side view of the second example embodiment of the brake mounting apparatus for use on a front brake system of an automobile with a brake caliper housing and brake pads mounted on the brake mounting apparatus.

In the third example embodiment of the mounting bracket apparatus 220 as best presented in FIGS. 6-7, and the fourth example embodiment of the mounting bracket apparatus 320 as best presented in FIGS. 8-10, the webs 50 further each include a bottom face 56 that extends from the bridge 48 and converges with the top face 52 to the peak 54. It should be appreciated that the webs 50 could define a hollow between the bridge 48, top face 52 and bottom face 56, or the webs 50 could be filled with material between the bridge 48, top face 52 and bottom face 56 without departing from the scope of the subject disclosure. Furthermore, as presented in the fourth example embodiment best presented in FIGS. 8-10, an extension 57 can be disposed against the bottom face 56 to provide for additional damping and sound reduction. The extension 57 may have substantially the same shape as the sidewall 51. It should be appreciated that the extension 57 could have various shapes and sizes without departing from the scope of the subject disclosure.

Furthermore, it should be appreciated that the peak 54 of the webs 50 could extend to different lengths and can generally extend at different angles. As presented in FIGS. 3-9, the peak 54 of the webs 50 of the third and fourth example embodiments extends to a greater length than that of the first example embodiment.

The aspects of the webs as disclosed herein can be applied to mounting bracket apparatuses that are for use on both front and rear brake systems of automobiles. The first, third, and fourth embodiments of the mounting bracket apparatuses 20, 220, 320 as disclosed herein are for use on a rear brake system and the second example embodiment of the mounting bracket apparatus 120 is for use on a front brake system.

Figure 13:
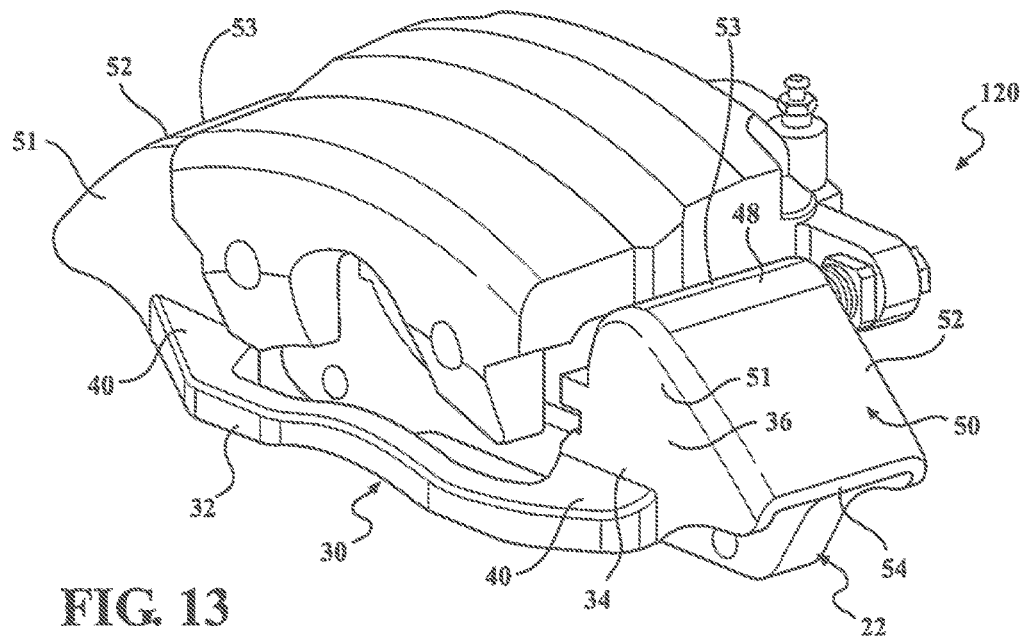
FIG. 13 is a perspective view of the second example embodiment of the brake mounting apparatus for use on a front brake system of an automobile with a brake caliper housing and brake pads mounted on the brake mounting apparatus.
Figure 14:
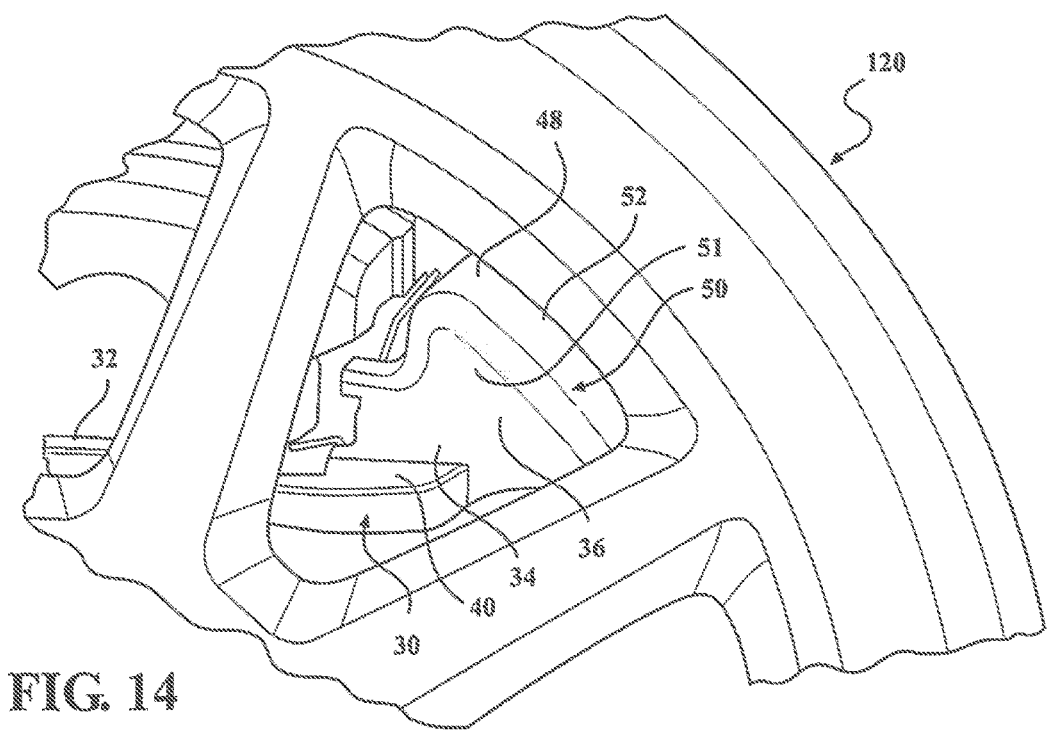
FIG. 14 is a perspective side view of the second example embodiment of the brake mounting apparatus for use on a front brake system of an automobile with the brake mounting bracket apparatus mounted on the rotor of a rotor of a rear brake system of an automobile.

As best presented in FIGS. 13-14, the webs 50 of the example embodiments, the webs 50 advantageously provide an aesthetically pleasing appearance without imposing mass and cost premiums since the mounting bracket apparatus consists of few components, and because the webs 50 are integrally connected with the bridges 48.

Figure 15:
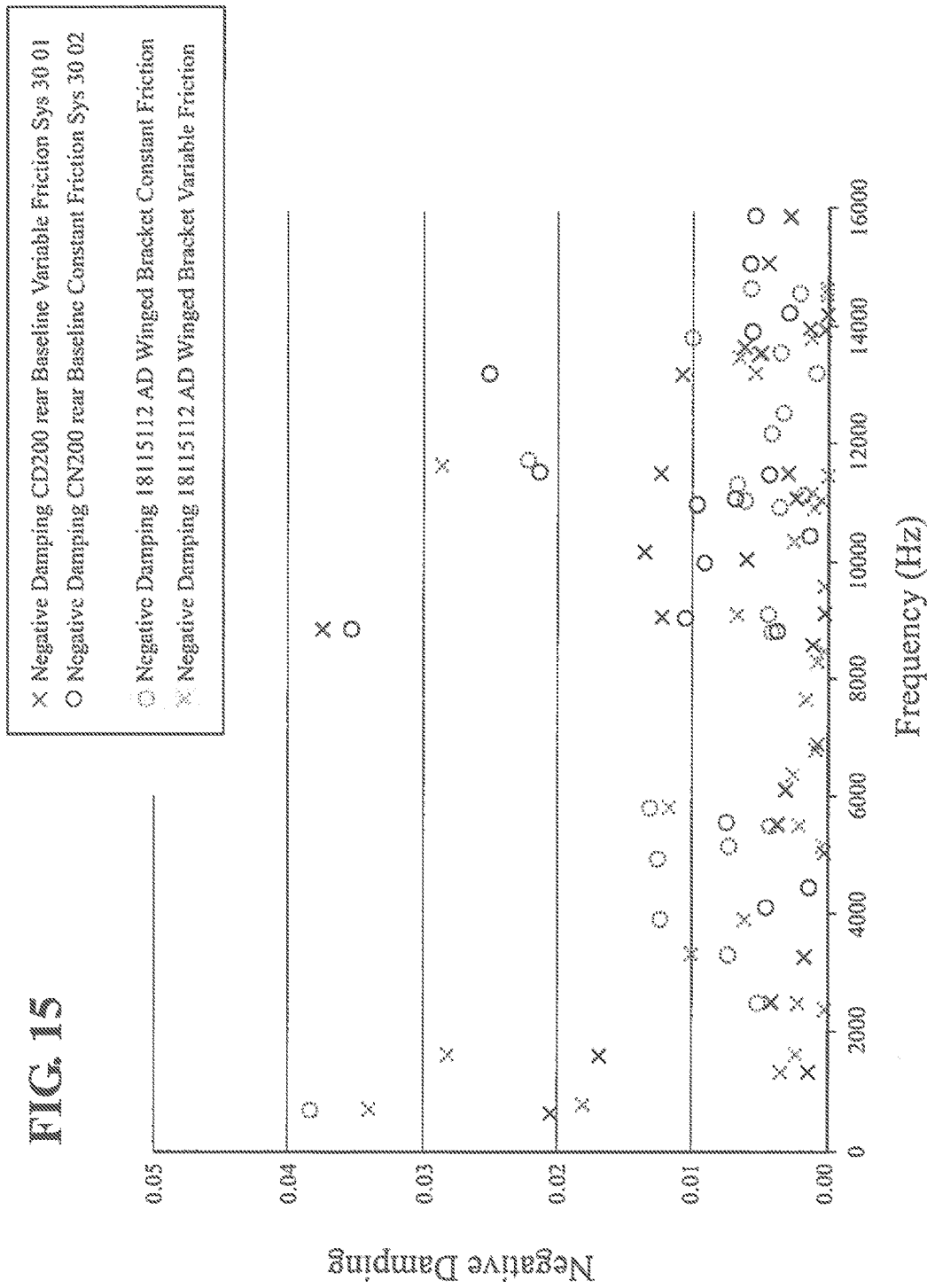
FIG. 15 is a graph presenting negative damping vs frequency during testing of the brake mounting apparatus.

As best presented in FIG. 15, the noise and vibration damping capabilities of the mounting bracket apparatus 20, 120, 220, 320 have been analytically confirmed. The X-axis of the graph presents frequency and the Y-axis of the graph presents a negative damping ratio. The graph represents the output of a complex eigenvalue analysis study wherein a corner of a model brake including an embodiment of the mounting bracket apparatus 20, 120, 220, 320 (the 19115112 AD Winged Bracket) was analyzed in relation to a model conventional brake that does not include the webs 50 of the subject invention (the CN200 Rear Baseline bracket). A higher negative damping ratio represents a more unstable the mode at that particular frequency. Numerous data points are plotted on the graph, as there are generally numerous instabilities in a system analytically. As presented at approximately 9 kHz, the negative damping ratio was reduced significantly for the AD Winged Bracket in comparison to the CN200 Rear Baseline Bracket.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A brake mounting bracket apparatus for a vehicle, said brake mounting bracket apparatus comprising:

a rear body and a front body disposed in spaced and substantially parallel relationship with one another each for holding a brake pad of the vehicle, said rear body including an inboard tie bar extending between a pair of margins, said rear body further including a pair of legs, wherein each of said legs extends between a lower portion and and a terminal end, and wherein said lower portion of one of said legs is located at one of said margins, and wherein said lower portion of the other of said legs is located at the other of said margins, said front body including an outboard tie bar extending between a pair of boundaries, said front body further including a pair of arms, wherein each of said arms extends between a bottom portion and a distal end, and wherein said bottom portion of one of said arms is located adjacent to one of said boundaries of said outboard tie bar, and wherein said bottom portion of the other of said arms is located adjacent to the other of said boundaries of said outboard tie bar, a pair of bridges each extending in an axial direction between said terminal end of one of said legs and said distal end of one of said arms and extending axially past said distal end of said one of said arms for connecting said front and rear bodies to one another, a pair of webs each extending outwardly from one of said bridges for providing stiffness to said bridges and for damping vibrations in said mounting bracket apparatus, wherein said pair of webs each defines an uppermost region at said distal end of one of said arms and an outermost peak spaced outwardly from said uppermost region, wherein said pair of webs each further defines a pair of sidewalls that extend in spaced and substantially parallel relationship with one another and said pair of arms and said pair of legs, wherein said pair of webs each has a top face between said bridge, said outermost peak, and said sidewalls, and wherein said pair of webs each defines a recess extending therein between said sidewalls and concaved toward said top face for receiving masses of material to provide for frequency tuning of the vibration damping capabilities of the mounting bracket apparatus, wherein said recesses each are in part defined between a corresponding one of said arms and corresponding sidewalls of the corresponding one of said webs in said axial direction, wherein a portion of each of said pair of webs extends away from the corresponding one of said bridges beyond an outer surface of a corresponding distal end of one of said arms to a corresponding outermost peak, thereby forming an outermost portion of each of said pair of webs at the corresponding outermost peak which is axially adjacent an outer surface of a corresponding terminal end of one of said legs.

2. The brake mounting bracket apparatus as set forth in claim 1 wherein said pair of webs are each integrally connected with one of said bridges.

3. The brake mounting bracket apparatus as set forth in claim 1 wherein said outermost peak of each of said webs is spaced outwardly from said inboard and outboard tie bars.

4. The brake mounting bracket apparatus as set forth in claim 1 wherein said outermost peak of each of said webs is spaced from said inboard and outboard tie bars in an upward direction generally toward said terminal end of said leg.

5. The brake mounting bracket apparatus as set forth in claim 1 wherein each of said legs and said arms define a slot for receiving a tab of a brake pad for securing the brake pads to said legs and said arms, each of said slots extend between a bottommost periphery neighboring said lower portion of said leg and a topmost periphery neighboring said terminal portion of one of said legs, and said outermost peak of each of said webs is spaced in said upward direction from said bottommost portions of said slots.

6. The brake mounting bracket apparatus as set forth in claim 1 wherein said rear body extends along a back plane and said front body extends along a front plane that is disposed in spaced and parallel relationship with said back plane, and each of said sidewalls of said webs extend in parallel relationship with said front and back planes.

7. The brake mounting bracket apparatus as set forth in claim 6 wherein said outboard tie bar includes a base that extends in spaced and parallel relationship with said front plane and a pair of fingers that each extend perpendicularly to said front plane away from said base to said bottom portion of one of said arms.

8. The brake mounting bracket apparatus as set forth in claim 6 wherein said lower portion of each of said legs defines a mounting opening extending substantially perpendicularly to said back plane for connecting said rear body to a steering knuckle or axle assembly bracket of a vehicle.

9. The brake mounting bracket apparatus as set forth in claim 6 wherein said legs extend from said inboard tie bar at said lower portions and diverge away from one another to said end potions.

10. The brake mounting bracket apparatus as set forth in claim 9 wherein said arms extend from said outboard tie bar at said bottom portions and diverge away from one another to said distal ends.

11. A brake mounting bracket apparatus for a vehicle comprising:
a rear body and a front body disposed in spaced and parallel relationship with one another each for holding a brake pad of the vehicle;
said rear body including an inboard tie bar extending along a back plane, and a pair of legs each extending along said back plane between a lower portion engaging said inboard tie bar and a terminal end spaced from said inboard tie bar;
said front body including an outboard tie bar extending in spaced and parallel relationship with said inboard tie bar, and a pair of arms each extending along a front plane in parallel relationship with said back plane with said arms extending between a bottom portion engaging said outboard tie bar and a distal end spaced from said outboard tie bar;
a pair of bridges each extending in an axial direction between said terminal end of one of said legs and said distal end of one of said arms and extending axially past said distal end of said one of said arms for connecting said front and rear bodies to one another;
a pair of webs each extending outwardly from one of said bridges for providing stiffness to said bridges and for damping vibrations in said mounting bracket apparatus during operation of the vehicle,
wherein said pair of webs each defines an uppermost region at said distal end of one of said arms and an outermost peak spaced outwardly from said uppermost region,
wherein said pair of webs each further defines a pair of sidewalls that extend in spaced and substantially parallel relationship with one another and parallel to said back plane and said front plane,
wherein said pair of webs each has a top face between said bridge, said outermost peak, and said sidewalls, and wherein said pair of webs each defines a recess extending therein between said sidewalls and concaved toward said top face for receiving masses of material to provide for frequency tuning of the vibration damping capabilities of the mounting bracket apparatus,
wherein said recesses each are in part defined between a corresponding one of said arms and corresponding sidewalls of the corresponding one of said webs in said axial direction,
wherein a portion of each of said pair of webs extends away from the corresponding one of said bridges beyond an outer surface of a corresponding distal end of one of said arms to a corresponding outermost peak, thereby forming an outermost portion of each of said pair of webs at the corresponding outermost peak which is axially adjacent an outer surface of a corresponding terminal end of one of said legs.

12. A brake mounting bracket apparatus for a vehicle, said brake mounting bracket apparatus comprising:
a rear body and a front body disposed in spaced and substantially parallel relationship with one another each for holding a brake pad of the vehicle,
said rear body including an inboard tie bar extending between a pair of margins,
said rear body further including a pair of legs, wherein each of said legs extends between a lower portion and a terminal end, and wherein said lower portion of one of said legs is located at one of said margins of said inboard tie bar, and wherein said lower portion of the other of said legs is located at the other of said margins of said inboard tie bar,
said front body including an outboard tie bar extending between a pair of boundaries,
said front body further including a pair of arms, wherein each of said arms extends between a bottom portion and a distal end, and wherein said bottom portion of one of said arms is located at one of said boundaries of said outboard tie bar, and wherein said bottom portion of the other of said arms is located at the other of said boundaries of said outboard tie bar,
a pair of bridges each extending in an axial direction between said terminal end of one of said legs and said distal end of one of said arms and extending axially past said distal end of said one of said arms for connecting said front and rear bodies to one another,
a pair of webs each extending outwardly from one of said bridges for providing stiffness to said bridges and for damping vibrations in said mounting bracket apparatus,
each of said pair of webs defining an uppermost region at said distal end of one of said arms and an outermost peak spaced outwardly from said uppermost region, with said outermost peaks of said webs extending in opposite directions relative to one another,
said pair of webs each defining a first sidewall and a second sidewall disposed in parallel relationship with one another and with said pair of arms and said pair of legs, wherein said first and second sidewalls are spaced from one another in an axial direction, and wherein said first sidewalls are positioned in alignment with one another in said axial direction,
each of said pair of webs having a top face and a bottom face opposite said top face, said top face of each of said webs extending between said sidewalls from said uppermost region to said outermost peak, said bottom faces of said webs each extending in a concave shape toward said top face of said corresponding web to define a recess between said top face, said sidewalls, said bridge and said outermost peak of said corresponding web, and said distal end of each of said arms engaging said inner surface of said corresponding web and being spaced axially from said sidewalls of said corresponding web.

* * * * *